United States Patent [19]
Meyers et al.

[11] Patent Number: 5,978,783
[45] Date of Patent: Nov. 2, 1999

[54] FEEDBACK CONTROL SYSTEM FOR TELECOMMUNICATIONS SYSTEMS

[75] Inventors: Martin H. Meyers, Montclair; Ahmed A. Tarraf, Bayonne; Carl F. Weaver, Morris Plains, all of N.J.

[73] Assignee: Lucent Technologies Inc., Murray Hill, N.J.

[21] Appl. No.: 08/882,436

[22] Filed: Jun. 25, 1997

Related U.S. Application Data

[63] Continuation-in-part of application No. 08/520,191, Aug. 28, 1995, Pat. No. 5,758,027, which is a continuation-in-part of application No. 08/370,917, Jan. 10, 1995, Pat. No. 5,715,372.

[51] Int. Cl.⁶ .............................. G06E 1/00; G06E 3/00; G06F 15/18; G06G 7/00
[52] U.S. Cl. ............................... 706/21; 706/22; 706/23; 706/62; 706/45; 704/203
[58] Field of Search ........................ 706/15, 14; 704/203

[56] References Cited

U.S. PATENT DOCUMENTS

| | | | |
|---|---|---|---|
| 3,746,793 | 7/1973 | Sachs et al. | 379/52 |
| 4,594,575 | 6/1986 | Avery et al. | 341/131 |
| 4,638,378 | 1/1987 | Zanessi | 360/15 |
| 4,658,426 | 4/1987 | Chabries et al. | 381/94.3 |
| 4,797,923 | 1/1989 | Clarke | 704/203 |
| 5,054,070 | 10/1991 | Eckstein et al. | 381/7 |
| 5,251,263 | 10/1993 | Andrea et al. | 381/71.6 |
| 5,299,281 | 3/1994 | Coolegem . | |

Primary Examiner—Tariq R. Hafiz
Assistant Examiner—Wilbert L. Starks

[57] ABSTRACT

Telecommunications processing is applied to a reference signal to generate a signal under test. A fidelity measure is generated characterizing the fidelity of the signal under test relative to the reference signal. A control signal is generated from the fidelity measure, where the control signal is used as a feedback signal to adjust the telecommunications processing. In one embodiment, the reference signal is a speech signal and the signal under test is a decoded speech signal generated by encoding, transmitting, and decoding the reference speech signal. The fidelity signal is an average mean opinion score (MOS) and the control signal is used to control the speech decoding processing. For example, the speech decoding processing may involve a speech decoder followed by a post filter, and the control signal is the cut-off frequency of the post filter. Such an embodiment may be applied to real-time speech processing to adjust the speech decoding processing in the receiver of a telecommunications system that includes a speech encoder in a transmitter and a communications network. Intermittently, the transmitter encodes reference signals that are also known to the receiver. The receiver performs the processing of the present invention to update its speech decoding processing to optimize speech quality.

27 Claims, 3 Drawing Sheets

FEEDBACK CONTROL SYSTEM FOR TELECOMMUNICATIONS SYSTEMS

This application is a continuation-in-part of U.S. patent application Ser. No. 08/520,191 ("the '191 application"), filed Aug. 28, 1995, now U.S. Pat. No. 5,758,027, which is itself a continuation-in-part of U.S. patent application Ser. No. 08/370,917 ("the '917 application"), filed Jan. 10, 1995, now U.S. Pat. No. 5,715,372 both of which are incorporated herein by reference.

BACKGROUND OF THE INVENTION

1. Field of the Invention

The present invention relates to telecommunications, and, in particular, to the encoding of audio and/or video signals for transmission over a communications network to a remote decoder for playback.

2. Description of the Related Art

FIG. 1 shows a block diagram of a conventional telecommunications system 100 for audio/video communications. The ability of telecommunications system 100 to provide acceptable communications depends on the fidelity of (1) encoder 102, which encodes a signal at the transmitter, (2) communications (comm) network 104, over which the encoded signal is transmitted, and (3) decoder 106, which decodes the transmitted encoded signal at the receiver. The present invention is directed to a scheme for improving the quality of telecommunications, such as those provided by system 100. Further aspects and advantages of this invention will become apparent from the detailed description which follows.

SUMMARY OF THE INVENTION

The present invention is directed to a method and apparatus for processing telecommunications signals. Telecommunications processing is applied to generate a signal under test corresponding to a reference signal. A fidelity measure is generated characterizing the fidelity of the signal under test relative to the reference signal. A control signal is generated from the fidelity measure and used as a feedback signal to adjust the telecommunications processing.

The present invention is also directed to a system for processing telecommunications signals, comprising (a) a telecommunications system adapted to generate a signal under test from a reference signal; (b) a fidelity measuring apparatus adapted to generate a fidelity measure characterizing fidelity of the signal under test relative to the reference signal; and (c) a control signal generator adapted to generate a control signal from the fidelity measure, wherein the control signal is useable as a feedback signal to adjust the telecommunications system.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
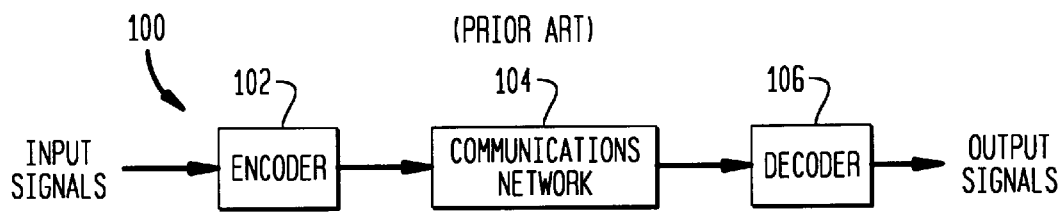
FIG. 1 shows a block diagram of a conventional telecommunications system for audio/video communications.

The present invention applies to a scheme for improving the quality of telecommunications. The scheme can be implemented off-line to design one or more components of a telecommunications system. Alternatively, the scheme can be implemented on-line to adjust telecommunications processing in real time. In either case, (a) telecommunications processing is applied to a reference signal to generate a signal under test, (b) a fidelity measure is generated characterizing the fidelity of the signal under test relative to the reference signal, and (c) a control signal is generated from the fidelity measure, where the control signal can be used as a feedback signal to adjust the telecommunications processing. In one embodiment, the reference signal and the signal under test correspond to the input and output signals of FIG. 1, respectively.

In one embodiment, the reference signal is a speech signal and the signal under test is a decoded speech signal generated by encoding, transmitting, and decoding the reference speech signal. The fidelity signal is an average mean opinion score (MOS) and the control signal is used to control the speech decoding processing. For example, the speech decoding processing may involve a speech decoder followed by a post filter, and the control signal is the cut-off frequency of the post filter. Such an embodiment may be applied to real-time speech processing to adjust the speech decoding processing in the receiver of a telecommunications system that includes a speech encoder in a transmitter and a communications network. Intermittently, the transmitter encodes reference signals that are also known to the receiver. The receiver performs the processing of the present invention to update its speech decoding processing to optimize speech quality. In alternative embodiments, fidelity measures other than MOS-related measures may be used.

Figure 2:
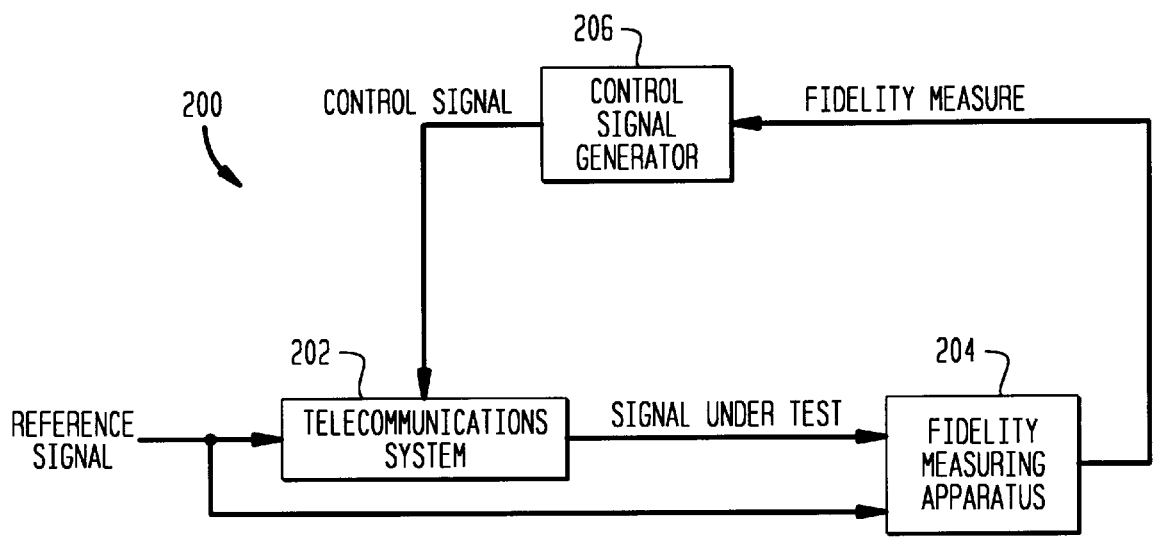
FIG. 2 shows a block diagram of a feedback signal-quality control system, according to one embodiment of the present invention.

FIG. 2 shows a block diagram of a feedback signal-quality control system 200, according to one embodiment of the present invention. Control system 200 can be used to design components, such as speech encoders and/or decoders or telecommunications network components, for telecommunications systems, such as system 100 of FIG. 1. As described later in this specification with regard to FIG. 5, the present invention can also be applied to real-time signal processing (e.g., speech processing). When used for off-line processing, telecommunications system 202 of control system 200 may be a model of an actual telecommunications system for the components being designed. For example, if speech encoders and/or decoders are being designed for a standard PSTN telephone network, then system 202 is an appropriate model of the effects such a network has on transmitted encoded speech signals.

Fidelity measuring apparatus 204 generates a fidelity measure by comparing a reference signal (RS) received by system 202 to the signal under test (SUT) generated by system 202. For speech processing, the SUT is the output speech signal that would be generated by the speech decoder in a receiver of an actual telecommunications system. Control signal generator 206 maps the fidelity measure into a control signal that is used to adjust one or more parameters that dictate the processing of system 202. Control system 200 operates as a feedback-based system that adjusts the signal processing of system 202 to optimize the fidelity of the output signal (i.e., the signal under test). When used to design system components, the optimized parameters can be hard-coded into the design of those components. When used for real-time signal processing, the optimized parameters are adjusted in real time.

Figure 3:
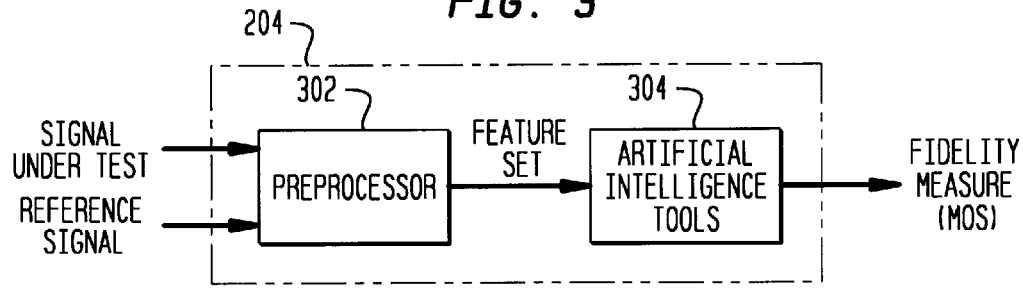
FIG. 3 shows a block diagram of the fidelity measuring apparatus of FIG. 2.

FIG. 3 shows a block diagram of fidelity measuring apparatus 204 of FIG. 2, according to one embodiment of the present invention. In this embodiment, fidelity measuring apparatus 204 is based on fidelity measuring apparatus 103 of the '191 application. Fidelity measuring apparatus 204 has a preprocessor 302 and an artificial intelligence (AI) tool 304. Preprocessor 302 compares the reference signal and the signal under test to generate a feature set that AI tool 304 uses to generate the fidelity measure. The feature set is based upon mathematical modeling of the peripheral auditory system. The fidelity measure generated by the fidelity measuring apparatus of the '191 application is a mean opinion score (MOS) similar to those typically used to characterize the voice quality of telecommunications systems. The training of AI tool 304 is preferably performed off line from the processing of control system 200. The operations of preprocessor 302 and AI tool 304 are described in detail in the '191 and '917 applications.

Figure 4:
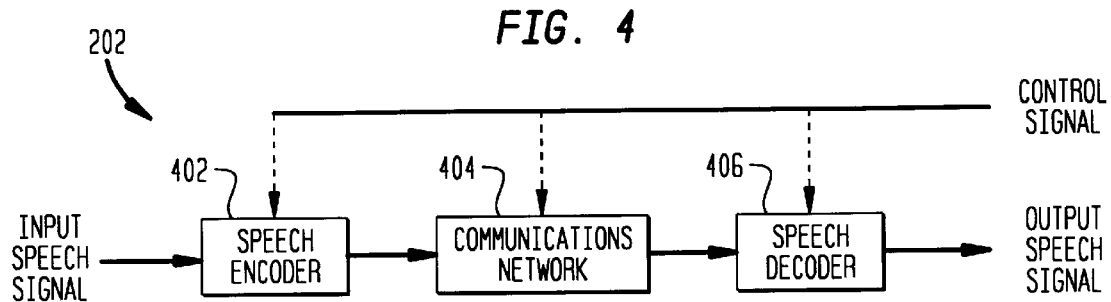
FIG. 4 shows a block diagram of the telecommunications system of FIG. 2.

FIG. 4 shows a block diagram of telecommunications system 202 of FIG. 2, according to one embodiment of the present invention. In this embodiment, system 202 may be used as part of control system 200 to design any one or more of the speech encoder, communications network, and speech decoder for a telecommunications system, such as system 100 of FIG. 1. In typical applications of control system 200, the designer will likely have control over the design of the speech encoder and/or decoder, but not the communications network. Nevertheless, the present invention can, in principle, also be used to design communications networks. Depending on which components are being designed, the control signal generated by generator 206 of FIG. 2 is used to adjust parameters for those components (e.g., encoder 402, network 404, and/or decoder 406). This adjustment function is shown as broken lines in FIG. 4. Comm network 404 may be some appropriate model of the effects of an actual comm network. For example, the effects of wireless communications (e.g., time-division multiple access (TDMA) or code-division multiple access (CDMA)) or transmission over a standard PSTN telephone network can be adequately modeled as a linear-to-mu_law conversion followed by a mu_law-to-linear conversion.

Figure 5:
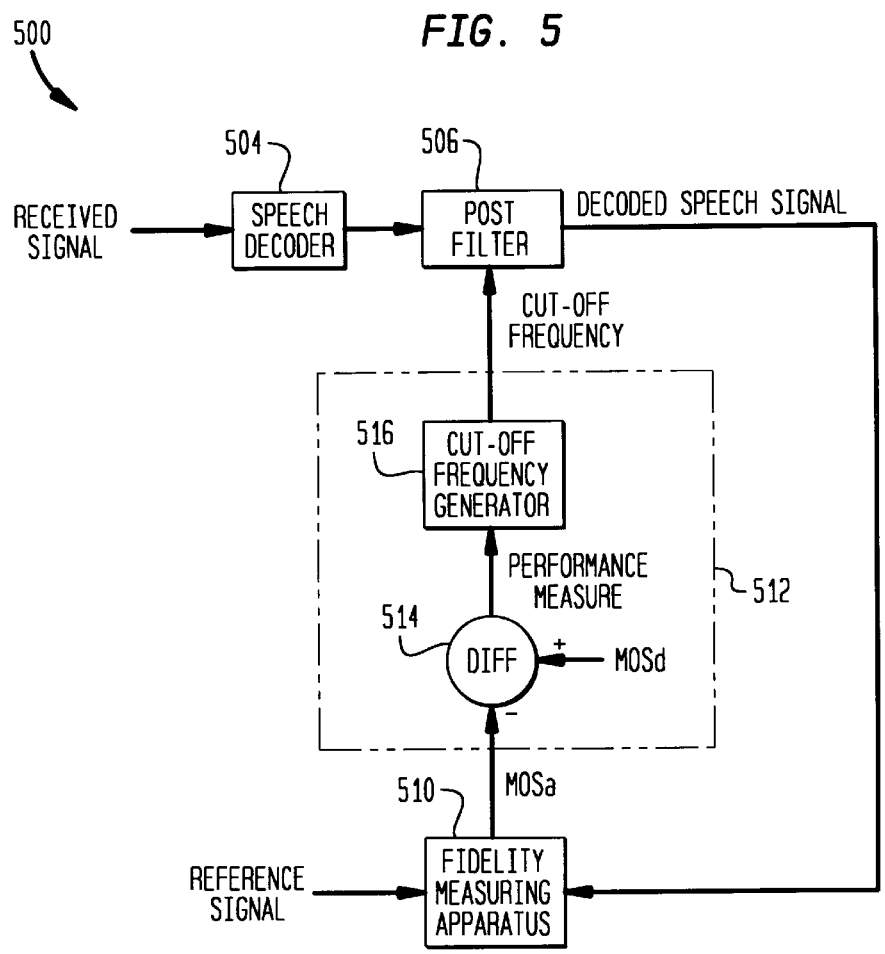
FIG. 5 shows a block diagram of a particular implementation of the system of FIG. 2.

FIG. 5 shows a block diagram of a real-time feedback signal-quality control system 500, according to one embodiment of the present invention. As suggested earlier, the present invention can be used to adjust one or more parameters in real-time to control the quality of signal processing. Control system 500 is implemented in a receiver that decodes encoded speech signals generated in a transmitter and transmitted over a communications network to the receiver. Periodically (e.g., once per hour) and/or upon demand, the transmitter encodes a known reference signal (e.g., a speech signal corresponding to a spoken sentence or two) for transmission over the comm network to the receiver. The receiver, which has a copy of the reference signal, applies the processing of FIG. 5 to the received signal and the known reference signal to update its speech decoding processing in real time.

Control system 500 includes speech decoder 504, post filter 506, fidelity measuring apparatus 510, and control signal generator 512. In this embodiment, post filter 506 represents the last stage in the speech decoding process of the receiver and is external to speech decoder 504. Post filter 506 is a lowpass tilt filter with unity gain up to a cut-off frequency a and a roll-off (e.g., 10 dB) from that cut-off frequency to the maximum frequency (e.g., 4 kHz). The processing of post filter 506 is adjusted in real time based on a feedback signal that represents an updated value for the cut-off frequency.

Speech decoder 504 decodes the received signal, and post filter 506 filters the decoded signal generated by speech decoder 504. The filtered signal from post filter 506 and the corresponding reference signal are input to fidelity measuring apparatus 510. Fidelity measuring apparatus 510 is preferably similar to fidelity measuring apparatus 204 of FIG. 3 (and apparatus 103 of the '191 application), with the filtered signal corresponding to the signal under test of apparatus 204. Apparatus 510 generates a current average MOS score MOSa(k).

Control signal generator 512 uses the current average MOS score (MOSa(k)) to generate the cut-off frequency a for post filter 506. Within generator 512, the current average MOS score MOSa(k) is subtracted from a specified desired MOS score (MOSd(k)) at difference node 514 to generate a current performance measure J(k), according to Equation (1) as follows:

$$J(k) = (MOSd(k) - MOSa(k))^2 \qquad (1)$$

The performance measure J(k) is used by cut-off frequency generator 516 to generate a current cut-off frequency a(k), according to the gradient descent rule of Equation (2) as follows:

$$a(k+1) = a(k) + \eta(\partial J(k)/\partial a(k)) \qquad (2)$$

where η is a parameter (e.g., between 0 and 1) that determines the rate of convergence of the performance measure J to a local minimum. As processing continues, control system 500 will converge towards a value for the cut-off frequency a that minimizes the performance measure J.

In one implementation, control system 500 can be used for off-line signal processing. For example, control system 500 can be used to design a post filter for a receiver. That is, control system 500 can be used to generate a value for cut-off frequency a to be hard coded into the post filter of the receiver. In that case, k may be an iteration counter and a finite set of input speech signals may be repeatedly processed by control system 500 until the performance measure J is sufficiently small. The finite set of input speech signals may comprise voice samples from one or more different people.

In an alternative implementation, control system 500 can be used for real-time processing of speech signals in an actual telecommunications system. In that case, control system 500 will be used intermittently to process signals corresponding one or more reference signals to adjust the speech decoding processing in real time. In such real-time applications, each set of received signal and corresponding reference signal is typically processed through control system 500 only once. If, however, the processing speed of the control system permits, repeated processing of each set of signals should only improve the fidelity of the voice communications.

Figure 6:
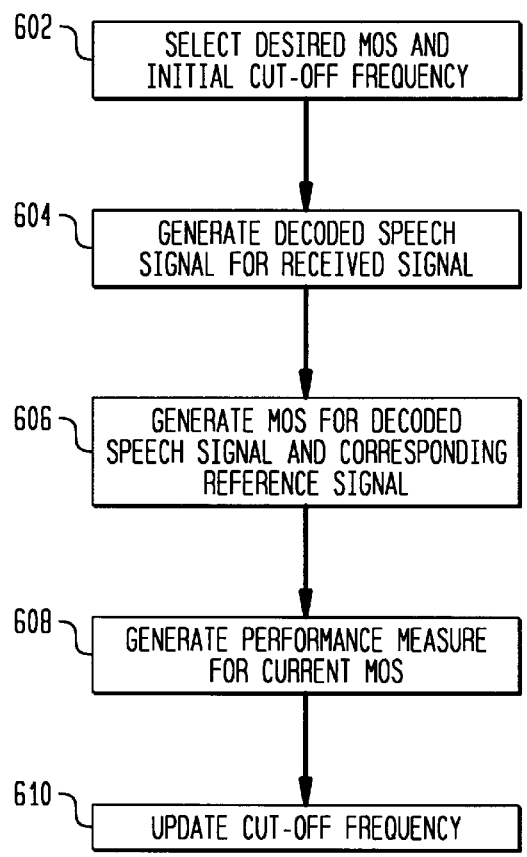
FIG. 6 shows a flow diagram of the processing implemented by the control system of FIG. 5 for each received signal and corresponding reference signal.

FIG. 6 shows a flow diagram of the processing implemented by control system 500 of FIG. 5 for each set of received signal and corresponding reference signal, according to one embodiment of the present invention. A value for the desired MOS (MOSd) is selected (e.g., a value between 3.5 and 5), and the initial value for the cut-off frequency a is selected (e.g., an arbitrary value between 1500 and 3600 Hz) (step 602 of FIG. 6). The received signal is then decoded using speech decoder 504 and post filter 506 of FIG. 5 to generate the decoded speech signal (i.e., the signal under test) (step 604). Fidelity measuring apparatus 510 of FIG. 5 generates the current average MOS (MOSa(k)) from the reference signal and the decoded speech signal (step 606). Difference node 514 of FIG. 5 implements Equation (1) to generate the current performance measure J(k) for the current average MOS (step 608). Cut-off frequency generator 516 of FIG. 5 implements Equation (2) to generate the updated cut-off frequency a(k+1) for the current performance measure (step 610).

Depending on the available processing resources, the processing of FIG. 6 may be repeated one or more times for each set of received signal and corresponding reference signal. Moreover, the processing of FIG. 6 may be repeated using different sets of signals. Furthermore, the processing of FIG. 6 may be performed intermittently to maintain optimal speech quality over time.

As one particular real-time application, control system 500 of FIG. 5 may be used in a digital cellular network that relies on IS54 (VSELP)/QCELP speech coders to generate encoded speech signals for time division multiple access (TDMA) or code division multiple access (CDMA) transmission. For example, control system 500 may be used during real-time speech signal processing to control one or more of the signal-processing parameters (e.g., the cut-off frequency of the receiver post filter). Embodiments of control system 500 may be implemented in either the base station (e.g., to adjust speech decoder parameters in the uplink direction) or the mobile station (e.g., to adjust speech decoder parameters in the downlink direction) or both.

In the example of control system 500 of FIG. 5, the present invention is used to control the cut-off frequency of a post filter applied after a speech decoder. Those skilled in the art will understand that, in other embodiments of the present invention, other parameters can be controlled using the present invention instead of or in addition to the post-filter cut-off frequency. These parameters may correspond to any stage of signal processing over which some degree of control can be exercised, including speech encoding and decoding, frequency conversion, signal modulation and encoding for transmission, and even possibly the transmission process itself.

In the example of control system 500 of FIG. 5, the present invention is used to control the processing of speech signals. Those skilled in the art will understand that the present invention can be applied to control other types of signals that are transmitted over a distributed telecommunications system, including other types of audio signals, video signals, and data. In these alternative embodiments, the signal processing path analogous to that shown in FIG. 4 may have other types of components, such as filters and analog-to-digital (A/D) and digital-to-analog (D/A) converters.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing telecommunications signals, comprising the steps of:

(a) applying telecommunications processing to generate a signal under test corresponding to a reference signal, wherein the telecommunications processing comprises transmission over a communications (comm) network;

(b) generating a fidelity measure characterizing fidelity of the signal under test relative to the reference signal, wherein the telecommunications processing has not been applied to the reference signal;

(c) generating a control signal from the fidelity measure; and (d) using the control signal as a feedback signal to adjust the telecommunications processing.

2. The invention of claim 1, wherein the reference signal is an input speech signal and the signal under test is a decoded speech signal.

3. The invention of claim 2, wherein:

the telecommunications processing comprises a speech encoder, the comm network, and a speech decoder; and step (a) comprises the steps of:

(1) generating an encoded speech signal by applying the speech encoder to the input speech signal; and (2) generating the decoded speech signal by applying the comm network and the speech decoder to the encoded speech signal.

4. The invention of claim 2, wherein the control signal is used as the feedback signal to adjust speech decoding processing.

5. The invention of claim 2, wherein:

step (a) comprises the step of applying speech decoding processing to generate the decoded speech signal from a received signal corresponding to a reference speech signal that has been encoded by a speech encoder and transmitted over the comm network;

step (b) comprises the step of generating an average mean opinion score (MOS) from the decoded speech signal and the reference speech signal;

step (c) comprises the step of generating the control signal from the average MOS; and step (d) comprises the step of using the control signal to adjust the speech decoding processing.

6. The invention of claim 5, wherein:

the speech decoding processing is implemented by a speech decoder followed by a post filter; and the control signal is a cut-off frequency for the post filter.

7. The invention of claim 6, wherein:

a performance measure is generated from a difference between the average MOS and a desired MOS; and an adjusted cut-off frequency is generated from the performance measure using a gradient descent rule.

8. The invention of claim 5, wherein steps (a)–(d) are applied intermittently to one or more sets of reference signal and signal under test during real-time speech processing.

9. The invention of claim 1, wherein step (b) comprises the steps of:

(1) generating a feature set from the reference signal and the signal under test; and (2) applying an AI tool to the feature set to generate the fidelity measure.

10. The invention of claim 1, wherein:

the telecommunications processing comprises a signal encoder, the comm network, and a signal decoder; and step (a) comprises the steps of:

(1) generating an encoded signal by applying the signal encoder to the reference signal; and (2) generating the signal under test by applying the comm network and the signal decoder to the encoded signal.

11. The invention of claim 1, wherein steps (a)–(d) are applied two or more times to one or more sets of reference signal and signal under test.

12. The invention of claim 1, wherein:
the telecommunications processing comprises a signal decoder;
step (a) comprises the step of generating the signal under test by applying the signal decoder to a received signal corresponding to the reference signal that has been encoded by a signal encoder and transmitted over the comm network; and
the control signal is used to adjust processing of the signal decoder.

13. The invention of claim 12, wherein steps (a)–(d) are applied intermittently to one or more sets of reference signal and signal under test during real-time signal processing.

14. An apparatus for processing telecommunications signals, comprising:
(a) means for applying telecommunications processing to generate a signal under test corresponding to a reference signal, wherein the telecommunications processing comprises transmission over a comm network;
(b) means for generating a fidelity measure characterizing fidelity of the signal under test relative to the reference signal, wherein the telecommunications processing has not been applied to the reference signal;
(c) means for generating a control signal from the fidelity measure; and
(d) means for using the control signal as a feedback signal to adjust the telecommunications processing.

15. A system for processing telecommunications signals, comprising:
(a) a telecommunications system adapted to generate a signal under test from a reference signal, wherein the telecommunications system comprises transmission over a comm network;
(b) a fidelity measuring apparatus adapted to generate a fidelity measure characterizing fidelity of the signal under test relative to the reference signal, wherein the telecommunications system has not processed the reference signal; and
(c) a control signal generator adapted to generate a control signal from the fidelity measure, wherein the control signal is useable as a feedback signal to adjust the telecommunications system.

16. The invention of claim 15, wherein the reference signal is an input speech signal and the signal under test is a decoded speech signal.

17. The invention of claim 16, wherein:
the telecommunications system comprises a speech encoder, the comm network, and a speech decoder;
the speech encoder are adapted to generate an encoded speech signal from the input speech signal; and
the comm network and the speech decoder are adapted to generate the decoded speech signal from the encoded speech signal.

18. The invention of claim 16, wherein the control signal is used as the feedback signal to adjust speech decoding processing.

19. The invention of claim 16, wherein:
the telecommunications system is adapted to apply speech decoding processing to generate the decoded speech signal from a received signal corresponding to a reference speech signal that has been encoded by a speech encoder and transmitted over the comm network;
the fidelity measuring apparatus is adapted to generate an average MOS from the decoded speech signal and the reference speech signal;
the control signal generator is adapted to generate the control signal from the average MOS; and
the telecommunications system uses the control signal to adjust the speech decoding processing.

20. The invention of claim 19, wherein:
the telecommunications system comprises a speech decoder followed by a post filter; and
the control signal is a cut-off frequency for the post filter.

21. The invention of claim 20, wherein:
the control signal generator generates a performance measure from a difference between the average MOS and a desired MOS; and
the control signal generator generates an adjusted cut-off frequency from the performance measure using a gradient descent rule.

22. The invention of claim 19, wherein processing of the telecommunications system, the fidelity measuring apparatus, and the control signal generator is applied intermittently to one or more sets of reference signal and signal under test during real-time speech processing.

23. The invention of claim 15, wherein the fidelity measuring apparatus:
(1) generates a feature set from the reference signal and the signal under test; and
(2) applies an AI tool to the feature set to generate the fidelity measure.

24. The invention of claim 15, wherein:
the telecommunications system comprises a signal encoder, the comm network, and a signal decoder;
the signal encoder generates an encoded signal by applying the signal encoder to the reference signal; and
the comm network and the signal decoder generate the signal under test from the encoded signal.

25. The invention of claim 15, wherein processing of the telecommunications system, the fidelity measuring apparatus, and the control signal generator is applied two or more times to one or more sets of reference signal and signal under test.

26. The invention of claim 15, wherein:
the telecommunications system comprises a signal decoder;
the signal decoder generates the signal under test from a received signal corresponding to the reference signal that has been encoded by a signal encoder and transmitted over the comm network; and
the control signal is used to adjust processing of the signal decoder.

27. The invention of claim 26, wherein processing of the telecommunications system, the fidelity measuring apparatus, and the control signal generator is applied intermittently to one or more sets of reference signal and signal under test during real-time signal processing.

* * * * *